(12) United States Patent
Kawabata

(10) Patent No.: US 8,958,084 B2
(45) Date of Patent: Feb. 17, 2015

(54) IMAGE PROCESSING APPARATUS HAVING A SELECTABLE POWER-SAVING MODE, AND IMAGE PROCESSING METHOD USING THE SELECTABLE POWER-SAVING MODE

(75) Inventor: Kazuya Kawabata, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 322 days.

(21) Appl. No.: 13/292,617

(22) Filed: Nov. 9, 2011

(65) Prior Publication Data

US 2012/0262755 A1 Oct. 18, 2012

(30) Foreign Application Priority Data

Apr. 18, 2011 (JP) ................................. 2011-092305

(51) Int. Cl.
| | |
|---|---|
| G06F 3/12 | (2006.01) |
| G06K 15/00 | (2006.01) |
| H04N 1/46 | (2006.01) |
| G06F 1/00 | (2006.01) |
| H04N 1/00 | (2006.01) |

(52) U.S. Cl.
CPC ....... *H04N 1/00347* (2013.01); *H04N 1/00896* (2013.01); *H04N 2201/0072* (2013.01); *H04N 2201/0081* (2013.01); *H04N 2201/0082* (2013.01); *H04N 2201/0087* (2013.01)
USPC .......... 358/1.13; 358/1.14; 358/505; 713/323

(58) Field of Classification Search
CPC .................. H04N 2201/0087; H04N 1/00347; H04N 1/00965; H04N 1/00915
USPC ........................... 713/300, 320, 323, 324, 340
See application file for complete search history.

(56) References Cited

U.S. PATENT DOCUMENTS

| | | | | |
|---|---|---|---|---|
| 2003/0184828 | A1* | 10/2003 | Morisaki ........................ | 358/524 |
| 2010/0260000 | A1* | 10/2010 | Sridhara .................. | 365/189.15 |
| 2011/0093727 | A1* | 4/2011 | Hwang ......................... | 713/320 |

FOREIGN PATENT DOCUMENTS

JP    A-2008-134765    6/2008

\* cited by examiner

*Primary Examiner* — Thomas Lett
(74) *Attorney, Agent, or Firm* — Oliff PLC

(57) ABSTRACT

An image processing apparatus includes a connection unit that is connected to an external storage device, an image reading unit that reads image data to be stored on the external storage device at least, a controller that controls power to be supplied to the image reading unit by selecting between a standard mode and a power-saving mode consuming power less than in the standard mode. When the external storage device is connecting to the connection unit while the power-saving mode is selected, the controller determines whether the external storage device is enable to be written or not. The controller supplies power to the image reading unit in the standard mode if the controller determines the external storage device is enable to be written, or supplies power to the image reading unit in the power-saving mode if the controller determines the external storage device is not enable to be written.

9 Claims, 3 Drawing Sheets

| MODE | POWER CONSUMPTION |
|---|---|
| STANDARD | HIGH |
| FIRST POWER-SAVING | MEDIUM |
| SECOND POWER-SAVING | LOW |

IMAGE PROCESSING APPARATUS HAVING A SELECTABLE POWER-SAVING MODE, AND IMAGE PROCESSING METHOD USING THE SELECTABLE POWER-SAVING MODE

CROSS-REFERENCE TO RELATED APPLICATIONS

This application is based on and claims priority under 35 USC 119 from Japanese Patent Application No. 2011-092305 filed Apr. 18, 2011.

BACKGROUND (i) Technical Field

The present invention relates to an image processing apparatus, and an image processing method.

(ii) Related Art

One type of known image processing apparatus has an image forming function for printing an image on a medium such as a paper medium, and an image reading function for scanning an image printed on a paper medium. Another type of known image processing apparatus is provided with a port connectable to an external storage device such as a universal serial bus (USB) memory, prints image data stored on the USB memory, and stores a scanned image on the USB memory.

Yet another type of known image processing apparatus operates switchably between a standard mode and a power-saving mode in order to reduce power consumed thereby.

SUMMARY

According to an aspect of the invention, there is provided an image processing apparatus including a connection unit that is connectable to an external storage device, an image reading unit that reads image data to be stored on the external storage device at least, and a controller that controls power to be supplied to the image reading unit by selecting between a standard mode and a power-saving mode consuming power less than in the standard mode. When the external storage device is connecting to the connection unit while the power-saving mode is selected, the controller determines whether the external storage device is enable to be written or not. The controller supplies power to the image reading unit in the standard mode if the controller determines the external storage device is enable to be written, or supplies power to the image reading unit in the power-saving mode if the controller determines the external storage device is not enable to be written.

BRIEF DESCRIPTION OF THE DRAWINGS

Exemplary embodiments of the present invention will be described in detail based on the following figures, wherein.

DETAILED DESCRIPTION

Exemplary embodiments of the present invention are described with reference to the attached drawing.

Figure 1:
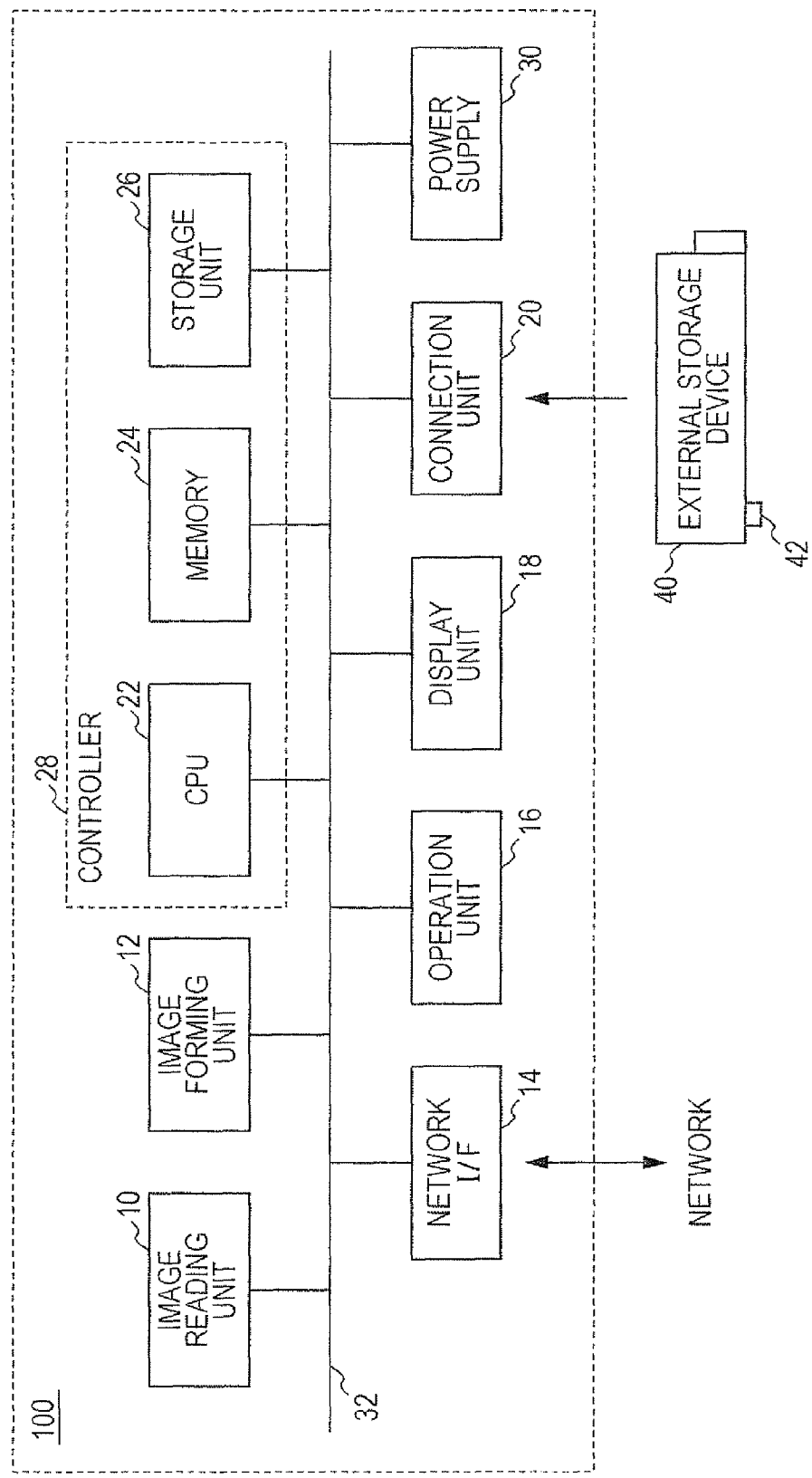
FIG. 1 is a block diagram illustrating a configuration of an image processing apparatus of a first exemplary embodiment.

FIG. 1 is a block diagram of an image processing apparatus 100 of a first exemplary embodiment. The image processing apparatus 100 includes image reading unit 10, image forming unit 12, network interface (I/F) 14, operation unit 16, display unit 18, connection unit 20, central processing unit (CPU) 22, memory 24, storage unit 26, and power supply 30. These hardware elements are mutually connected via data bus 32. Each element is powered by the power supply 30. The CPU 22, the memory 24, and the storage unit 26 function as a controller 28 that controls the image processing apparatus 100.

The image reading unit 10 reads (scans) an image formed on a predetermined medium (such as paper). For example, the image reading unit 10 may be an optical scanner. The image read by the image reading unit 10 is stored as image data on the storage unit 26.

The image forming unit 12 forms (prints) an image on a predetermined medium (such as paper). For example, the image forming unit 12 may be an ink-jet printer or a laser printer. The image forming unit 12 forms (prints) an image in response to the image data stored on the storage unit 26 or the image data input from the outside. The type of data processed by the image processing apparatus 100 (printed by the image forming unit 12) as printable data is predetermined. The printable data includes document data in a portable document format (PDF), Microsoft Office Word document data, and Joint Photographic Experts Group (JPEG) image data. The printable data is not limited these types of data.

The network I/F 14 connects the image processing apparatus 100 to an external network. The network I/F 14, if connected to a local area network (LAN) cable, may exchange data with an information processing apparatus over the network. The operation unit 16 receives an operation input from a user. The operation unit 16 may be a touchpanel, for example. The display unit 18 displays data to the user. The display unit 18 may include a liquid-crystal display. If the operation unit 16 is a touchpanel, the operation unit 16 may also serve as the display unit 18.

The connection unit 20 is an interface to connect the image processing apparatus 100 to an external storage device 40. The connection unit 20 may be a universal serial bus (USB) port, for example. The external storage device 40 stores image data in accordance with which the image processing apparatus 100 forms an image, and stores image data read by the image processing apparatus 100. The external storage device 40 may be a USB memory. The external storage device 40 may include a switch 42. With the switch 42, the user sets whether to enable writing to the external storage device 40.

The CPU 22 is an example of processor executing a predetermined program. With the CPU 22 executing the program, the controller 28 performs a variety of control processes of the image processing apparatus 100. The control processes of the controller 28 include an image forming (printing) control process, an image reading (scanning) control process, and a power supplying control process to hardware elements. The memory 24 temporarily stores data to be processed by the CPU 22. The memory 24 may be a synchronous dynamic random access memory (SDRAM). The storage unit 26 stores data of a relatively large size. The storage unit 26 may be one of a variety of read-only memories (ROMs).

The controller 28 controls an amount of power that the power supply 30 supplies to each of the hardware elements. According to an exemplary embodiment, the controller 28 switches between a standard mode in which a power consumption is high, and a power-saving mode in which the power consumption is lower than the power consumption in the standard mode. The setting of the standard mode and the power-saving mode may be performed on a per hardware element basis.

When the image processing apparatus 100 does not perform one of the image reading process and the image forming process, a hardware element not in use is set to be in the power-saving mode in order to save power. The canceling of the power-saving mode (the switching to the standard mode) is performed if one of the predetermined conditions (including an operation to the operation unit 16, data inputting from the network, and a connection of the external storage device 40 to the connection unit 20) is satisfied. If the power-saving mode is switched off on all the hardware elements, the power-saving mode is also canceled on a hardware element not in use for data processing. Reduction in power consumption is not efficiently performed. A process to reduce power consumption of the image processing apparatus 100 is discussed below.

Figure 2:
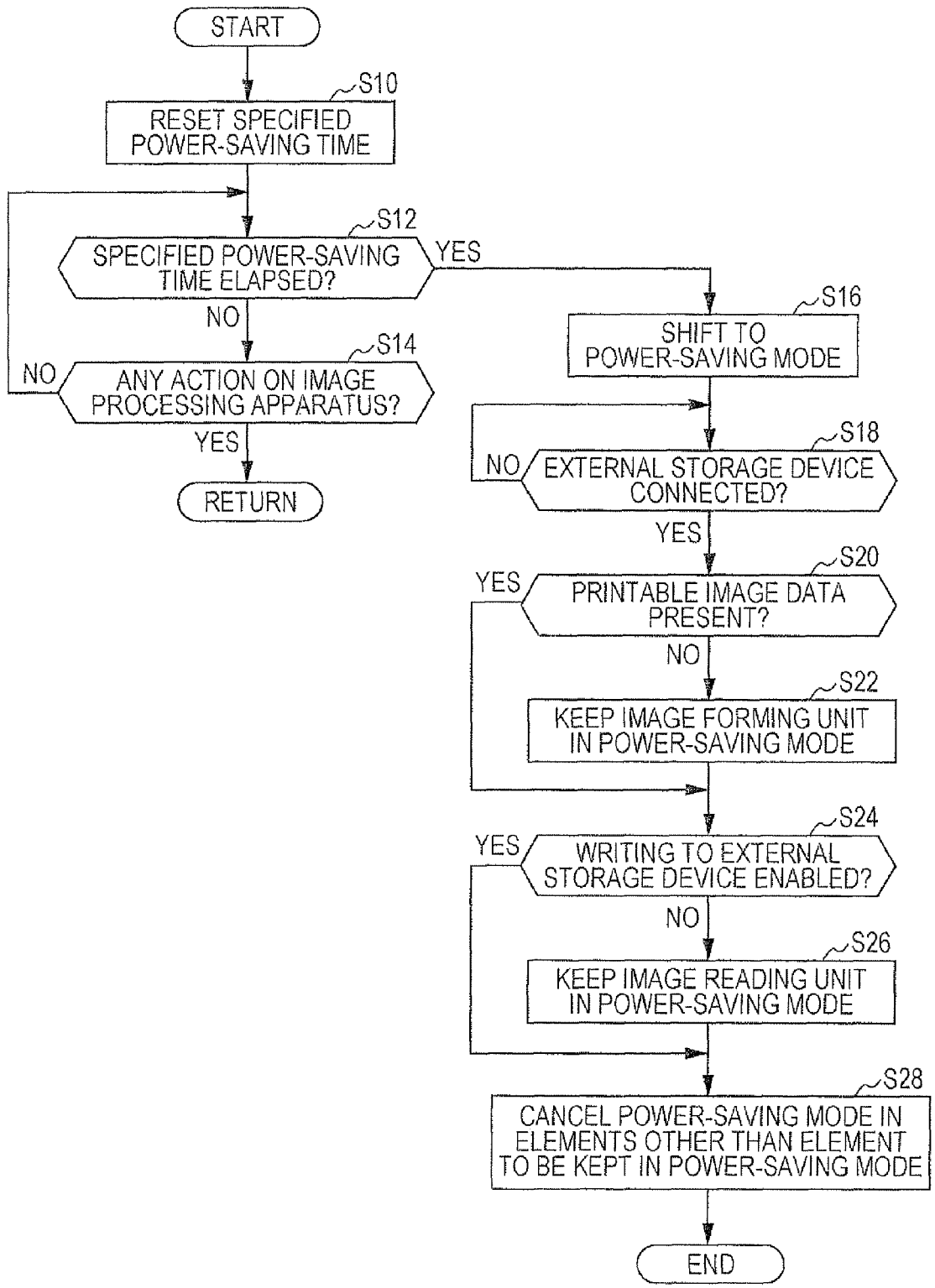
FIG. 2 is a flowchart illustrating an operation of the image processing apparatus of the first exemplary embodiment.

FIG. 2 is a flowchart of the process of the image processing apparatus 100 of the first exemplary embodiment. At the startup of the image processing apparatus 100, power supplying to the hardware elements thereof is performed in the standard mode.

The controller 28 resets specified power-saving time and starts counting time (step S10). Any specified power-saving time may be set by the user. The controller 28 determines whether the time count exceeds the specified power-saving time (5 minutes, for example) (step S12). If the time count has not yet exceeded the specified power-saving time, the controller 28 determines whether one of the actions (including a user operation to the operation unit 16, and a reception of a print command via the network) has been taken on the image processing apparatus 100 (step S14). If any action has been taken, the controller 28 returns to the startup and resets the count. If no action has been taken, processing returns to before step S12.

If the time count has exceeded the specified power-saving time in step S12, the controller 28 switches the power supplying from the standard mode to the power-saving mode (step S16).

The controller 28 determines whether the external storage device 40 is connected to the connection unit 20 (step S18). If the external storage device 40 is not connected, processing returns to before step S18, and the power-saving mode is maintained.

If it is determined in step S18 that the external storage device 40 is connected, the controller 28 determines whether the printable data to be printed by the image processing apparatus 100 is present on the external storage device 40 (step S20). The determination as to whether the printable data is present on the external storage device 40 is performed based on extensions of data files stored on the external storage device 40 (such as ".pdf", ".doc", ".jpeg", and the like). The determination is not limited to this method.

If the printable data is not present on the external storage device 40, the image forming unit 12 remains inactive. The controller 28 does not cancel power-saving on the image forming unit 12, and the power-saving mode is thus maintained (step S22). The printable data is determined to be not present on the external storage device 40 if a memory in the external storage device 40 is empty (with no data stored at all), or if only unprintable data is stored on the external storage device 40. If the printable data is present, processing proceeds to step S24 with step S22 skipped.

The controller 28 determines whether data writing to the external storage device 40 is enabled (step S24). If the data writing to the external storage device 40 is disabled, the image reading unit 10 remains inactive. The controller 28 does not cancel power-saving on the image reading unit 10 and the power-saving mode is thus maintained (step S26). The data writing is determined to be disabled if the external storage device 40 is write-protected by the switch 42, or if the available memory space is insufficient. If the data writing is enabled, processing proceeds to step S28 with step S26 skipped.

The controller 28 finally cancels the power-saving mode on the elements other than the elements where the power-saving mode is to be maintained (step S28). Power is thus supplied in the standard mode to the hardware elements other than the hardware elements where the power-saving mode is maintained in step S22 and step S26. More specifically, if the printable data is stored on the external storage device 40, the controller 28 cancels the power-saving mode on the image forming unit 12 in step S28, and then the image processing apparatus 100 reverts back to the standard mode. The image data on the external storage device 40 is thus printed. If the data writing to the external storage device 40 is enabled, the controller 28 cancels the power-saving mode on the image reading unit 10 in step S28, and the image processing apparatus 100 reverts back to the standard mode. The image reading unit 10 reads an image and the read image is stored on the external storage device 40.

The "hardware elements other than the hardware elements where the power-saving mode is maintained" include the hardware elements other than the image reading unit 10 and the image forming unit 12 (i.e., the operation unit 16, the display unit 18, and the controller 28, including the CPU 22, the memory 24, and the storage unit 26, and the like). These hardware elements appropriately perform an operation and displaying related to the image reading process and the image forming process.

The image processing apparatus 100 of the first exemplary embodiment cancels the power-saving mode on the image forming unit 12 if the printable data is stored on the external storage device 40. The image processing apparatus 100 cancels the power-saving mode on the image reading unit 10 if the writing to the external storage device 40 is enabled. The power-saving mode is canceled on a per hardware element basis. The power consumption is reduced in this way more than when the power-saving mode is canceled on the entire image processing apparatus 100. Reduction in the power consumption is efficiently performed.

In the exemplary embodiment, the user may be alerted if the writing to the external storage device 40 is disabled, and if no printable data is stored on the external storage device 40. An alerting process in such a case is illustrated in a flowchart of FIG. 3. Steps S30 and S32 are respectively identical to steps S20 and S24. If the determinations in both steps S30 and S32 are a no loop, the controller 28 gives an alert to the user (step S34). For example, the controller 28 displays an error message on the display unit 18 to alert the user. In order to perform the alert process on the display unit 18, the controller 28 cancels the standard mode on the display unit 18 in step S28 of FIG. 2. Even when the power-saving mode is maintained on the image reading unit 10 and the image forming unit 12, the power-saving mode is canceled on another hardware element as appropriate in step S28 of FIG. 2.

Figures 3, 4:
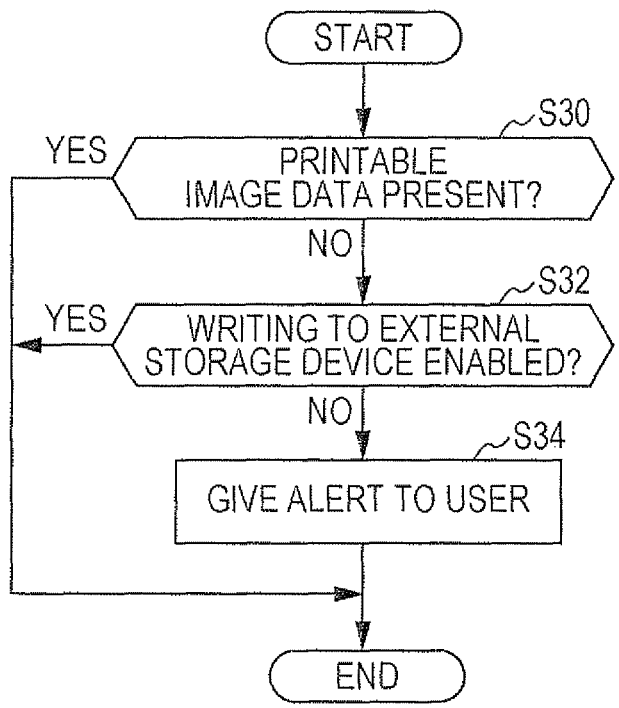
FIG. 3 is a flowchart illustrating an operation of a modification of the image processing apparatus.
FIG. 4 is a table listing the relationship between the power-saving mode and power consumption of the modification of the image processing apparatus.

In the first exemplary embodiment, the controller 28 adjusts power consumption in two modes, i.e., the standard mode and the power-saving mode. In addition to the two modes, another mode such as a power-supplying mode may be included. As illustrated in FIG. 4, the power-saving mode may be split into a first power-saving mode at a medium consumption level and a second power-saving mode at a low consumption level. The power supplying is thus adjusted in three modes. The image processing apparatus 100 may revert back to the standard mode from one of the first power-saving mode and the second power-saving mode. The power supplying is set in multi-level modes so that the power consumption is reduced more efficiently.

In the first exemplary embodiment, in step S28, the power-saving mode is canceled on the hardware elements other than the hardware elements where the power-saving mode is to be maintained. The cancelling of the power-saving mode is not necessarily performed at a time on the hardware elements other than the image reading unit 10 and the image forming unit 12. For example, if the power-saving mode is canceled on only the image reading unit 10 first, the canceling of the power-saving mode is performed on only the minimum hardware elements used for the image reading process (for example, the operation unit 16, the display unit 18, and the controller 28). For example, if the power-saving mode is canceled on only the image forming unit 12 first, the canceling of the power-saving mode is performed on only the minimum hardware elements used for the image forming process (for example, the operation unit 16, the display unit 18, and the controller 28). The canceling condition of the power-saving mode may be appropriately set on the hardware elements other than the image reading unit 10 and the image forming unit 12.

In the first exemplary embodiment, the image processing apparatus 100 includes the image reading unit 10 and the image forming unit 12. Alternatively, the image reading unit 10 may include only one of the image reading unit 10 and the image forming unit 12. Without the image reading unit 10, steps S24 and S26 of FIG. 2 are not performed. Without the image forming unit 12, steps S20 and S22 of FIG. 2 are not performed.

In the first exemplary embodiment, the image processing apparatus 100 shifts to the power-saving mode if the specified power-saving time has elapsed. Another shift condition to the power-saving mode may be used. For example, the image processing apparatus 100 may be immediately shifted if a predetermined operation is made on the operation unit 16.

The exemplary embodiments of the present invention have been discussed. The present invention is not limited to any particular embodiment. A variety of modifications and changes are possible within the scope of the invention defined by the following claims and their equivalents.

What is claimed is:

1. An image processing apparatus, comprising:
   a connection unit that is connectable to an external storage device;
   an image reading unit that reads image data to be stored on the external storage device at least; and
   a controller that controls power to be supplied in at least a standard mode or a power-saving mode, the power-saving mode consuming power less than in the standard mode,
   wherein, when the external storage device is connected to the connection unit while the power-saving mode is selected, the controller determines whether the external storage device is write enabled, and supplies power to the image reading unit in the standard mode if the external storage device is write enabled, and supplies power to the image reading unit in the power-saving mode if the external storage device is not write-enabled.

2. The image processing apparatus according to claim 1, further comprising an image forming unit that forms an image in accordance with data stored on the image processing apparatus,
   wherein when the external storage device is connected to the connection unit while the power-saving mode is selected, the controller determines whether data to be image-formed is stored on the external storage device or not, and supplies power to the image forming unit in the standard mode if the controller determines the data to be image-formed is stored, or supplies power to the image forming unit in the power-saving mode if the controller determines that the data to be image-formed is not stored.

3. The image processing apparatus according to claim 2, wherein the controller provides an alert to a user if the writing to the external storage device is disabled and if the data to be image-formed is not stored on the external storage device.

4. The image processing apparatus according to claim 1, wherein the controller provides an alert to a user if the writing to the external storage device is disabled and if the data to be image-formed is not stored on the external storage device.

5. An image processing method of an image processing apparatus, comprising:
   connecting a connection unit to an external storage device;
   reading image data to be stored on the external storage device at least; and
   controlling power to be supplied to an image reading unit by selecting between a standard mode and a power-saving mode consuming power less than in the standard mode,
   wherein, when the external storage device is connected to the connection unit while the power-saving mode is selected, the controller determines whether the external storage device is write enabled, and supplies power to the image reading unit in the standard mode if the external storage device is write enabled, and supplies power to the image reading unit in the power-saving mode if the external storage device is not write-enabled.

6. An image processing apparatus, comprising:
   a connection unit that is connectable to an external storage device;
   an image reading unit that reads image data to be stored on the external storage device at least; and
   a controller that controls an amount of power supplied to the image reading unit; and
   wherein when the external storage device connected to the connection unit while the amount of power being supplied is less than in case where the image reading unit is operating, the controller determines whether the external storage device is write enabled,
   and increases the amount of power being supplied to the image reading unit if the controller determines the external storage device is write enabled,
   and controls the amount of power supplied to be less than during operation of the image reading unit if the controller determines the external storage device is not write enabled.

7. An image processing apparatus, comprising:
   a connection unit that is connectable to an external storage device;
   an image reading unit that reads image data to be stored on the external storage device at least; and
   a controller that controls power to be supplied in at least a standard mode or a power-saving mode, the power-saving mode consuming power less than in the standard mode, an image forming unit that forms an image in accordance with data stored on the image processing apparatus,
   wherein when the external storage device is connected to the connection unit while the power-saving mode is selected, the controller determines whether data to be image-formed is stored on the external storage device, and supplies power to the image forming unit in the standard mode if the controller determines the data to be image-formed is stored, and supplies power to the image forming unit in the power-saving mode if the controller determines the data to be image-formed is not stored.

8. The image processing apparatus according to claim 7, wherein when the external storage device is connected to the connection unit while the power-saving mode is selected, the controller determines whether the external storage device is write enabled, and supplies power to the image reading unit in the standard mode if the controller determines the external storage device is write enabled, or supplies power to the image reading unit in the power-saving mode if the controller determines the external storage device is not write enabled.

9. The image processing apparatus according to claim 8, wherein the controller provides an alert to a user if the writing to the external storage device is disabled and if the data to be image-formed is not stored on the external storage device.

* * * * *